United States Patent
Senft

(10) Patent No.: US 11,835,011 B2
(45) Date of Patent: Dec. 5, 2023

(54) METHOD AND MOTOR CONTROLLER FOR MULTIPLE INJECTIONS WITH QUANTITY CORRECTION FOR AN INTERNAL COMBUSTION ENGINE

(71) Applicant: Vitesco Technologies GmbH, Regensburg (DE)

(72) Inventor: Peter Senft, Rieden (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/806,484

(22) Filed: Jun. 11, 2022

(65) Prior Publication Data
US 2022/0298989 A1 Sep. 22, 2022

Related U.S. Application Data

(63) Continuation of application No. PCT/EP2020/082499, filed on Nov. 18, 2020.

(30) Foreign Application Priority Data

Dec. 13, 2019 (DE) ...................... 10 2019 219 541.5

(51) Int. Cl.
*F02D 41/40* (2006.01)
*F02D 41/20* (2006.01)

(52) U.S. Cl.
CPC ............ *F02D 41/402* (2013.01); *F02D 41/20* (2013.01); *F02D 2041/2058* (2013.01); *F02D 2200/0616* (2013.01)

(58) Field of Classification Search
CPC ........ F02D 41/20; F02D 41/40; F02D 41/402; F02D 2200/0616; F02D 2041/2058
See application file for complete search history.

(56) References Cited

U.S. PATENT DOCUMENTS

| | | |
|---|---|---|
| 2003/0164166 A1 | 9/2003 | Takeuchi |
| 2004/0040534 A1 | 3/2004 | Herden |
| | (Continued) | |

FOREIGN PATENT DOCUMENTS

| | | |
|---|---|---|
| DE | 102004054240 A1 | 5/2006 |
| DE | 102008041659 A1 | 3/2009 |
| | (Continued) | |

OTHER PUBLICATIONS

DE 10 2016 119047 English Translation Version.*
(Continued)

*Primary Examiner* — John Kwon
*Assistant Examiner* — Johnny H Hoang

(57) ABSTRACT

A method for injecting a predetermined total fuel quantity via multiple injections using a fuel injector having a solenoid drive for an internal combustion engine of a motor vehicle is disclosed. The method includes determining a first target injection quantity to be injected per injection to inject the total fuel quantity throughout a series of consecutive injections; and performing a first subseries of consecutive injections, where the fuel injector is actuated according to the first target injection quantity. The method also includes determining a first fuel quantity injected during the first subseries of injections; determining a second target injection quantity to be injected per injection in a second subseries of consecutive injections, to inject the total fuel quantity throughout the first subseries and the second subseries of consecutive injections; and performing the second subseries of injections. The fuel injector is actuated according to the second target injection quantity.

12 Claims, 1 Drawing Sheet

(56) References Cited

U.S. PATENT DOCUMENTS

| | | | |
|---|---|---|---|
| 2006/0293828 A1* | 12/2006 | Ishizuka | F02D 41/1497 123/436 |
| 2009/0082943 A1* | 3/2009 | Sugiyama | F02D 41/26 701/103 |
| 2009/0082946 A1* | 3/2009 | Ishizuka | F02D 41/1498 701/106 |
| 2009/0112447 A1* | 4/2009 | Ishizuka | F02D 41/18 701/109 |
| 2009/0319157 A1* | 12/2009 | Ishizuka | F02D 41/2467 701/106 |
| 2010/0250096 A1* | 9/2010 | Yamada | F02D 41/401 123/447 |
| 2010/0324803 A1* | 12/2010 | Sugiyama | F02D 41/221 701/106 |
| 2012/0158271 A1 | 7/2012 | Joos | |
| 2012/0185155 A1 | 7/2012 | Nakata | |
| 2012/0215422 A1* | 8/2012 | Sugiyama | F02D 41/3845 701/104 |
| 2013/0104636 A1 | 5/2013 | Beer | |
| 2018/0216560 A1 | 8/2018 | Hauser | |

FOREIGN PATENT DOCUMENTS

| | | |
|---|---|---|
| DE | 102009052219 A1 | 5/2011 |
| DE | 102010018290 A1 | 10/2011 |
| DE | 102010063380 A1 | 6/2012 |
| DE | 102016119047 A1 | 4/2018 |
| EP | 1340900 A2 | 9/2003 |
| KR | 20180063891 A | 6/2018 |
| WO | 02063155 A1 | 8/2002 |

OTHER PUBLICATIONS

International Search Report and Written Opinion dated Feb. 19, 2021 for corresponding International Patent Application No. PCT/EP2020/082499.

German Office Action dated Mar. 30, 2020 for corresponding German Patent Application No. 10 2019 219 541.5.

Korean Office Action dated Aug. 24, 2023 for corresponding Patent Application No. 10-2022-7024043.

* cited by examiner

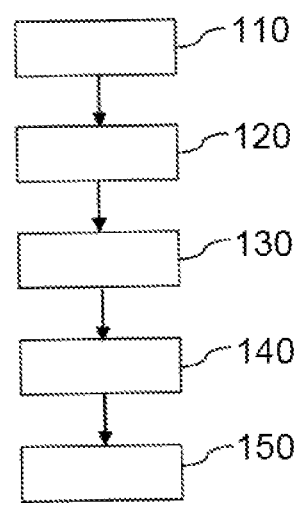

METHOD AND MOTOR CONTROLLER FOR MULTIPLE INJECTIONS WITH QUANTITY CORRECTION FOR AN INTERNAL COMBUSTION ENGINE

CROSS-REFERENCE TO RELATED APPLICATIONS

This application claims the benefit of PCT Application PCT/EP2020/082499, filed Nov. 18, 2020, which claims priority to German Application 10 2019 219 541.5, filed Dec. 13, 2019. The disclosures of the above applications are incorporated herein by reference.

TECHNICAL FIELD

The disclosure relates to the injection of fuel in internal combustion engines. More specifically, the disclosure relates to a method for injecting a predetermined total fuel quantity via multiple injections using a fuel injector having a solenoid drive for an internal combustion engine of a motor vehicle. The disclosure also relates to a motor controller and to a computer program.

BACKGROUND

In petrol-powered engines, direct injection with turbocharging has become standard. For the injection, injectors with solenoid drive are used since they provide a very economical solution. Because of the rising emissions standards, the requirements for the injection system are also rising. In particular, the requirements for the precision of the injected mass and the number of injections are rising.

For structural reasons, solenoid injectors have a minimum pause time, for example 1 ms (millisecond), which is necessary for completely dissipating the coil magnetization. If the pause times are shorter, the opening behavior of the injector is influenced because of the residual magnetization. If the injectors are energized in the known fashion, i.e., substantially controlled via fuel pressure and temperature, the quantity precision deteriorates because of the influence of residual magnetization.

SUMMARY

The disclosure provides a high quantity precision for multiple injections with short pause times, in a simple fashion and as economically as possible.

According to a one aspect of the disclosure, a method is described for injecting a predetermined total fuel quantity by multiple injections with a fuel injector having a solenoid drive, for an internal combustion engine of a motor vehicle. The described method includes the following steps: (a) determining a first target injection quantity which is to be injected per injection in order to inject the total fuel quantity throughout a series of consecutive injections; (b) carrying out a first subseries of consecutive injections, where the fuel injector is actuated according to the first target injection quantity; (c) determining a first fuel quantity injected during the first subseries of injections; (d) determining a second target injection quantity which is to be injected per injection in a second subseries of consecutive injections, in order to inject the total fuel quantity throughout the first subseries and the second subseries of consecutive injections; and (e) carrying out the second subseries of injections, where the fuel injector is actuated according to the second target injection quantity.

The described method is based on the knowledge that a surplus or shortfall of injected fuel occurring in the course of the first subseries of injections can be compensated by adapting the target injection quantity per injection for the (following) second subseries of injections, so that at the end of the second subseries of injections, in total the predetermined total fuel quantity has been injected.

Implementations of the disclosure may include one or more of the following optional features. In some implementations, at the start of the method, a first target injection quantity is determined. This corresponds to the quantity to be injected per injection so that in the ideal case, in total (throughout the number of injections in a working cycle), the predefined total fuel quantity is injected. Then the actual injection process begins with performance of the first subseries of successive injections based on the previously determined first target injection quantity per individual injection. In other words, during the first subseries, the fuel injector is actuated such that each individual injection leads to injection of the first target injection quantity. At the same time, the first fuel quantity (actually) injected is determined and used to determine a second target injection quantity which is to be injected per injection in the second subseries, so that in total (throughout the first and second subseries), the predefined total injection quantity is injected. Thus, a deviation occurring during the first subseries is corrected by adaptation of the target value for the second subseries.

In some implementations, the first subseries and the second subseries together form a multiple injection process in which the temporal interval between two successive injections is the same.

In other words, the pause times between all successive injections in the multiple injection process is the same, i.e., also between the last injection of the first subseries and the first injection of the second subseries.

In some examples, the temporal interval is so short that a magnetization of the solenoid drive from the preceding injection cannot be completely dissipated. For a typical fuel injector, this means that the temporal interval (or pause time) is shorter than 1 ms (millisecond).

In some examples, the second subseries contains a single injection. In this case, the deviation from the target value which occurred in the first subseries is accordingly compensated in a single, i.e., last injection of the injection process.

Alternatively, in some examples, the second subseries contains a plurality of injections. In this case, the deviation from the target value which occurred in the first subseries is accordingly compensated in several, i.e., in the last injections (following the first subseries) of the injection process.

In some implementations, the second target injection quantity is equal to the difference between the predetermined total fuel quantity and the determined first injected fuel quantity divided by the number of injections in the second subseries.

If SEM2 is the second target injection quantity, GKM the predetermined total fuel quantity, EKM1 the first injected fuel quantity and N2 the number of injections in the second subseries, this can be expressed by the following formula:

$$SEM2=(GKM-EKM1)/N2$$

For comparison, the above-mentioned first target injection quantity SEM1 may be calculated as follows (where N1 is the number of injections in the first subseries):

$$SEM1=GKM/(N1+N2)$$

In some implementations, the determination of the first fuel quantity injected during the first subseries of injections is an estimate of the injected fuel quantity based on a measured current curve and/or a measured voltage curve in the solenoid drive.

For example, the opening and closing times of the fuel injector can be determined by analysis of the temporal current curve and/or the temporal voltage curve in the coil of the solenoid drive. From this, the opening time and hence the injection duration for each injection can be determined and finally the injection quantity estimated with great precision.

Another aspect of the disclosure provides a motor controller for an internal combustion engine of a motor vehicle. The motor controller is configured to perform the method described above.

The described motor controller is based substantially on the same idea as the above-described method and allows simple implementation of the present disclosure without additional hardware.

Yet another aspect of the disclosure provides a computer program as described with computer-executable commands which, when they are executed by a processor, are configured to perform the method described above.

Within the meaning of this document, the designation of a computer program of this kind is equivalent to the concept of a program element, a computer program product and/or a computer-readable medium which contains instructions for controlling a computer system, in order to coordinate the manner of operation of a system or of a method in a suitable manner, in order to achieve the effects associated with the method according to the disclosure.

The computer program can be implemented as a computer-readable instruction code in any suitable programming language, such as in JAVA, C++, etc. for example. The computer program can be stored on a computer-readable storage medium (CD-ROM, DVD, Blu-ray disk, removable drive, volatile or non-volatile memory, integral memory/processor, etc.). The instruction code can program a computer or other programmable devices, such as a control device for an engine of a motor vehicle in particular, in such a way that the desired functions are executed. Furthermore, the computer program may be provided in a network such as, for example, the Internet, from which a user can download it as required.

The disclosure can be implemented both by way of a computer program, i.e. software, and by way of one or more specific electrical circuits, i.e. as hardware or in any desired hybrid form, i.e. by way of software components and hardware components.

It should be noted that implementations and examples of the disclosure have been described with reference to different subjects of the disclosure. In particular, some implementations and examples of the disclosure are described by way of method claims and other implementations and examples of the disclosure are described by way of device claims. However, it will become immediately clear to a person skilled in the art on reading this application that, unless explicitly stated otherwise, in addition to a combination of features which are associated with one type of subject matter of the disclosure, any combination of features which are associated with different types of subjects of the disclosure is also possible.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a block diagram of an exemplary method for injecting a predetermined total fuel quantity by multiple injection with a fuel injector.

Like reference symbols in the various drawings indicate like elements.

DETAILED DESCRIPTION

FIG. 1 shows a block diagram of an exemplary method 100 for injecting a predetermined total fuel quantity by multiple injection with a fuel injector having a solenoid drive for an internal combustion engine, such as a petrol engine of a motor vehicle.

Firstly, block 110 designates a first target injection quantity which is to be injected per injection in the multiple injection process in order in total to inject the predetermined total fuel quantity. This may take place such that the first target injection quantity is determined as the predetermined total fuel quantity divided by the total number of injections in the multiple injection process. If the total number is for example equal to eight, then the first target injection quantity is equal to one-eighth of the predetermined total fuel quantity.

Block 120 designates a first subseries of successive injections, where the fuel injector is actuated such that the previously determined first target injection quantity is injected per injection. The first subseries includes the majority of the total provided injections, for example six or seven of the total of eight injections.

Since, with short temporal intervals (pauses) between the individual injections, residual magnetization may be present in the solenoid drive of the fuel injector, this actuation of the fuel injector may lead to different (e.g., larger) actual injection quantities in at least some of the injections.

To solve this problem, at block 130, the first fuel quantity injected during the first subseries of injections is determined, for example by determining opening and closing times based on measured curves of current and voltage in the solenoid coil.

With knowledge of the fuel quantity injected so far, at block 140, a second target injection quantity is determined which is to be injected per injection in a second subseries of successive injections directly following the first subseries, in order, in the second subseries of injections, to inject the necessary remaining quantity of fuel so that overall, the total fuel quantity is injected throughout the first subseries and second subseries of successive injections.

At block 150, the second subseries of injections is carried out, where the fuel injector is actuated according to the second target injection quantity.

It should be noted that the first and second subseries of injections follow one another directly, and that there is no additional pause between the two subseries. In other words, the second target injection quantity is determined in the course of the total injection process.

The first subseries and the second subseries thus together form a multiple injection process in which the temporal interval between two successive injections is the same. Here the temporal interval is so short that a magnetization of the solenoid drive from the preceding injection cannot be completely dissipated.

The second subseries of injections contains the last injection or last injections in the total multiple injection process.

In some implementations, at block 140, the second target injection quantity is calculated as the difference between the predetermined total fuel quantity and the determined first injected fuel quantity divided by the number of injections in the second subseries.

This determination, carried out at block 130, of the first fuel quantity injected during the first subseries of injections includes, in some examples, an estimate of the injected fuel quantity based on a measured current curve and/or a measured voltage curve in the solenoid drive.

The method according to the disclosure may be implemented directly in a motor controller, for example in the form of a computer program. Here it is particularly advantageous that no additional hardware, such as special sensors or injectors, are required which would increase the total cost of the system.

A number of implementations have been described. Nevertheless, it will be understood that various modifications may be made without departing from the spirit and scope of the disclosure. Accordingly, other implementations are within the scope of the following claims.

What is claimed is:

1. A method for injecting a predetermined total fuel quantity via multiple injections using a fuel injector having a solenoid drive for an internal combustion engine of a motor vehicle, the method comprising:
    determining a first target injection quantity to be injected per injection to inject the total fuel quantity throughout a series of consecutive injections;
    carrying out a first subseries of consecutive injections, wherein the fuel injector is actuated according to the first target injection quantity;
    determining a first fuel quantity injected during the first subseries of injections;
    determining a second target injection quantity to be injected per injection in a second subseries of consecutive injections, to inject the total fuel quantity throughout the first subseries and the second subseries of consecutive injections; and
    carrying out the second subseries of injections, wherein the fuel injector is actuated according to the second target injection quantity,
    wherein the second subseries includes less injections than the first subseries, and
    wherein the second target injection quantity is equal to a difference between the predetermined total fuel quantity and the determined first injected fuel quantity divided by a number of injections in the second subseries.

2. The method of claim 1, wherein the first subseries and the second subseries together form a multiple injection process in which a temporal interval between two successive injections is the same.

3. The method of claim 2, wherein the temporal interval is so short that a magnetization of the solenoid drive from a preceding injection cannot be completely dissipated.

4. The method of claim 1, wherein the second subseries contains a single injection, or wherein a second series contains a plurality of injections.

5. The method of claim 1, wherein determination of the first fuel quantity injected during the first subseries of injections includes an estimate of the injected fuel quantity based on a measured current curve.

6. A computer program with computer-executable commands which, when they are executed by a processor, are configured to perform the method of claim 1.

7. The method of claim 1, wherein determination of the first fuel quantity injected during the first subseries of injections includes an estimate of the injected fuel quantity based on a measured voltage curve in the solenoid drive.

8. A motor controller for an internal combustion engine of a motor vehicle, the motor controller configured to perform a method for injecting a predetermined total fuel quantity via multiple injections using a fuel injector having a solenoid drive for an internal combustion engine of a motor vehicle, the method comprising:
    determining a first target injection quantity to be injected per injection to inject the total fuel quantity throughout a series of consecutive injections;
    carrying out a first subseries of consecutive injections, wherein the fuel injector is actuated according to the first target injection quantity;
    determining a first fuel quantity injected during the first subseries of injections;
    determining a second target injection quantity to be injected per injection in a second subseries of consecutive injections, to inject the total fuel quantity throughout the first subseries and the second subseries of consecutive injections; and
    carrying out the second subseries of injections, wherein the fuel injector is actuated according to the second target injection quantity,
    wherein the second subseries includes less injections than the first subseries, and
    wherein the second target injection quantity is equal to a difference between the predetermined total fuel quantity and the determined first injected fuel quantity divided by a number of injections in the second subseries.

9. The motor controller of claim 8, wherein the first subseries and the second subseries together form a multiple injection process in which a temporal interval between two successive injections is the same.

10. The motor controller of claim 9, wherein the temporal interval is so short that a magnetization of the solenoid drive from a preceding injection cannot be completely dissipated.

11. The motor controller of claim 8, wherein the second subseries contains a single injection, or wherein a second series contains a plurality of injections.

12. The motor controller of claim 8, wherein determination of the first fuel quantity injected during the first subseries of injections includes an estimate of the injected fuel quantity based on a measured current curve.

* * * * *